US011964503B2

(12) United States Patent
Barberan Latorre

(10) Patent No.: US 11,964,503 B2
(45) Date of Patent: Apr. 23, 2024

(54) MACHINE FOR PRINTING SUBSTRATES AND METHOD FOR PRINTING SUBSTRATES USING SAID MACHINE

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 42 days.

(21) Appl. No.: 17/609,230

(22) PCT Filed: May 19, 2020

(86) PCT No.: PCT/ES2020/070320
§ 371 (c)(1),
(2) Date: Nov. 5, 2021

(87) PCT Pub. No.: WO2020/234500
PCT Pub. Date: Nov. 26, 2020

(65) Prior Publication Data
US 2022/0212486 A1 Jul. 7, 2022

(30) Foreign Application Priority Data
May 22, 2019 (EP) .................................... 19382411

(51) Int. Cl.
*B41J 3/407* (2006.01)
*B41J 11/00* (2006.01)
*B41J 25/00* (2006.01)

(52) U.S. Cl.
CPC ....... *B41J 3/4073* (2013.01); *B41J 11/00214* (2021.01); *B41J 11/00218* (2021.01); *B41J 25/006* (2013.01)

(58) Field of Classification Search
CPC ................ B41J 3/4073; B41J 11/00214; B41J 11/00218; B41J 25/006; B41J 11/0015;
(Continued)

(56) References Cited

U.S. PATENT DOCUMENTS

2009/0120249 A1* 5/2009 Gauss ........................ B41J 3/28 82/162
2009/0120309 A1* 5/2009 Szyszko ............... B41J 11/0022 101/35
(Continued)

FOREIGN PATENT DOCUMENTS

CN 201291642 Y 8/2009
DE 102011051021 A1 12/2012
(Continued)

OTHER PUBLICATIONS

Zhu, Xue-jen, Transmitting Device And Locating Mechanism Thereof, May 14, 2019, China, All Pages (Year: 2019).*
(Continued)

*Primary Examiner* — Justin Seo
*Assistant Examiner* — Tracey M McMillion
(74) *Attorney, Agent, or Firm* — LUCAS & MERCANTI, LLP

(57) ABSTRACT

A machine for printing substrates and a method for printing substrates using the machine, which has a print head, the print head having at least one ejection nozzle for ejecting a product on the substrate; translation device with a movable part, the translation device configured for supporting and translating the substrate by the movable part; positioning device for establishing and fixing a relative position between the substrate and the print head. The machine additionally has guiding device for guiding the movable part; and holding device for fixing the substrate with respect to the movable part; with the substrate being fixed to the movable part and the movable part guided by the guiding device, the substrate can be translated to receive the product being ejected.

11 Claims, 7 Drawing Sheets

(58) Field of Classification Search
CPC ... B41J 11/0055; B41J 11/007; B41J 11/0085; B41J 11/20; B41J 11/62; B41J 25/308
See application file for complete search history.

(56) References Cited

U.S. PATENT DOCUMENTS

| | | | |
|---|---|---|---|
| 2009/0225145 | A1 | 9/2009 | Codos |
| 2011/0292145 | A1 | 12/2011 | Hoover et al. |
| 2016/0243857 | A1 | 8/2016 | Otsuka et al. |
| 2017/0348984 | A1 | 12/2017 | Pervan et al. |

FOREIGN PATENT DOCUMENTS

| | | | |
|---|---|---|---|
| EP | 1992494 | A2 | 11/2008 |
| ES | 2537154 | A1 | 6/2015 |
| JP | 2009050806 | A | 3/2009 |

OTHER PUBLICATIONS

Zhu, Xue-jun, Transmitting Device And Locating Mechanism Thereof, May 14, 2019, China, All pages (Year: 2019).*

Katsuragi Koji, Ink Set, White Ink, Recording Method, and Ink Discharging Device, May 9, 2019 Japan, All Pages (Year: 2019).*

Kodama Kengo, Inkjet Recording Device, May 10, 2018, Japan, All Pages (Year: 2018).*

Mokler Bernhard, Coating Apparatus I.e. Lacquer Finish Device, For Coating Side And Major Surfaces Of Tabular Goods I.e. Sheets Utilized For Packaging Industry, Has Print Head And Tabular Goods Moved Relative To Each Other, Jan. 26, 2012, DE, All Pages (Year: 2012).*

International Search Report for Corresponding International Application No. PCT/ES2020/070320 dated Sep. 23, 2020 and English translation; 12 pages.

* cited by examiner

MACHINE FOR PRINTING SUBSTRATES AND METHOD FOR PRINTING SUBSTRATES USING SAID MACHINE

CROSS REFERENCE TO RELATED APPLICATION

This Application is a 371 of PCT/ES2020/070320, filed on May 19, 2020, which claimed the priority of European Application No. 19382411.7, filed May 22, 2019, both of which are incorporated herein by reference.

FIELD OF THE ART

The present invention relates to the industry dedicated to printing on substrates, and more specifically to the industry dedicated to printing on substrates having surfaces according to different planes of inclination.

STATE OF THE ART

Ejecting products on substrates having a planar surface arranged according to a mainly horizontal plane is widely known today. Accordingly, substrates are known to be fed and moved until they are in correspondence with print heads, in which the required products are injected on upper faces of the substrates.

However, there are cases in which the substrates do not have a planar configuration, given that they sometimes have relief formations, consisting of both protrusions and depressions. Likewise, the products are sometimes required to be applied on end parts, on both side and front or rear end parts. In this manner, the substrates sometimes have different surfaces to be treated by the corresponding products, the surfaces of each of the substrates being arranged according to different planes of inclination.

A solution that is conventionally used consists of additional applications of the products by hand. Accordingly, once the corresponding substrate has received the required products in accordance with the upper and/or lower surface, operators apply the corresponding products on surfaces perpendicular to same. This solution has various drawbacks, such as a very long time for obtaining the substrates duly treated with the products, or a variable finish on each of the substrates, in addition to said finish being different with respect to that provided by the print heads.

In view of this problem, computer-guided machines are known to be used for performing the movements to be performed by operators for applying the products. Likewise, in view of this same problem, the substrates are known to be moved in correspondence with the print heads, the latter being arranged with different orientations. These solutions are advantageous compared to the solution described above, however it prevents obtaining high-quality finishes at least on one of the surfaces of each of the substrates given the indirect and unwanted ejection of the products on at least one of the surfaces.

In view of the described drawbacks or limitations the solutions existing today have, there is a need for a solution which allows applying the products on the surfaces arranged according to different planes of inclination, while at the same time providing a high quality application of said products.

OBJECT OF THE INVENTION

For the purpose of complying with this objective and solving the technical problems discussed up until now, in addition to providing additional advantages which can be seen below, the present invention provides a machine for printing substrates and a method for printing substrates using the machine according to that described.

The machine for printing substrates comprises a print head, the print head having at least one ejection nozzle for ejecting a product on the substrate; translation means with a movable part, the translation means being configured for supporting and translating the substrate by means of the movable part; and positioning means for establishing and fixing a relative position between the substrate and the print head.

The present machine additionally comprises guiding means for guiding the movable part and holding means for fixing the substrate with respect to the movable part. Accordingly, with the substrate being fixed to the movable part and the movable part guided by the guiding means, the substrate can be translated to receive the product being ejected.

The mentioned guiding means preferably comprise stops for preventing lateral movements of the movable part. Additionally or alternatively, the translation means preferably comprise projections in the movable part to establish, by contact, the support and translation of the substrate, at least one end part of the substrate and an area close to the end part being free of contacts such that the print head can be located in correspondence with a lower surface of the substrate, an upper surface of the substrate, and the end part joining the lower surface with the upper surface for ejecting the product onto the substrate.

The holding means are preferably configured for fixing the substrate by suction. Accordingly, the holding means preferably comprise through holes arranged for fixing the substrate through the translation means.

The ejection nozzles and the products are at least three in number, the ejection nozzles being arranged for ejecting each of the products in an independent manner, the products being a preparation product to be arranged directly on the substrate, a printing ink, and a finishing product for externally covering the printed substrate, i.e., once the printing thereof has ended.

The print head has one drying element for each of the ejection nozzles, each of the drying elements being arranged for at least partially curing the product from one of the ejection nozzles.

The present machine additionally comprises masking means in the print head configured for preventing a dispersion of the ejected product from reaching the substrate. The masking means preferably comprise a suction hole for suctioning up the dispersed product and/or a film for receiving the dispersed product.

The present machine additionally comprises control means for providing data relating to the substrate and data relating to a pattern to be printed, the control means being connected to the positioning means, the print head, and the translation means such that they actuate each of the ejection nozzles depending on said data and on a number of passes to be carried out.

The data relating to the substrate preferably comprises geometries, dimensions, translational speed, and relative position with respect to the print head. Additionally or alternatively, the data relating to the pattern preferably comprises the composition and amount of the product to be ejected by each of the ejection nozzles.

DETAILED DESCRIPTION OF THE INVENTION

The present invention relates to a machine for printing substrates (1), in addition to a method for printing the substrates (1) in accordance with said machine. The method can be derived from the description provided below.

Figure 1:
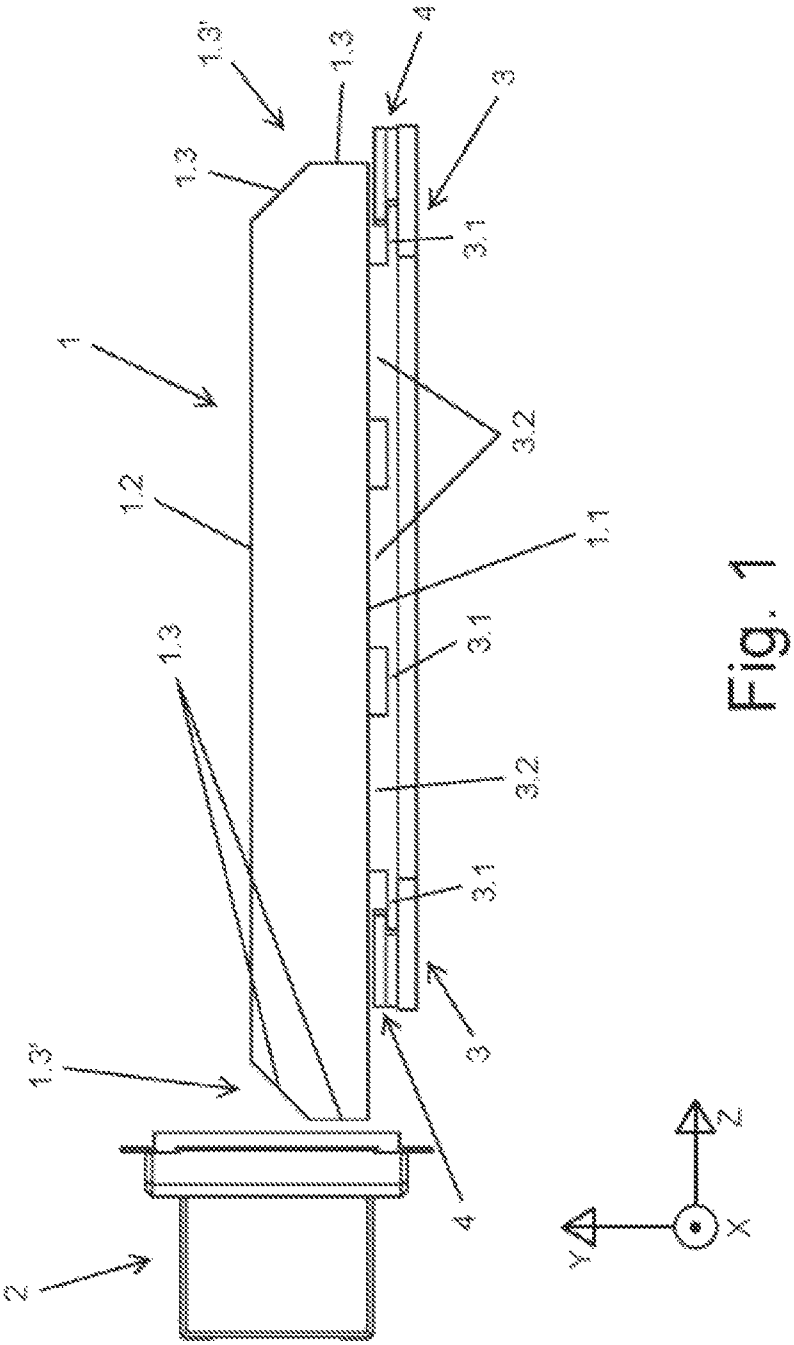
FIGS. 1 to 3 show partial schematic views of a print head and translation means comprised in a machine for printing substrates object of the invention, according to different embodiments.
Figure 2:
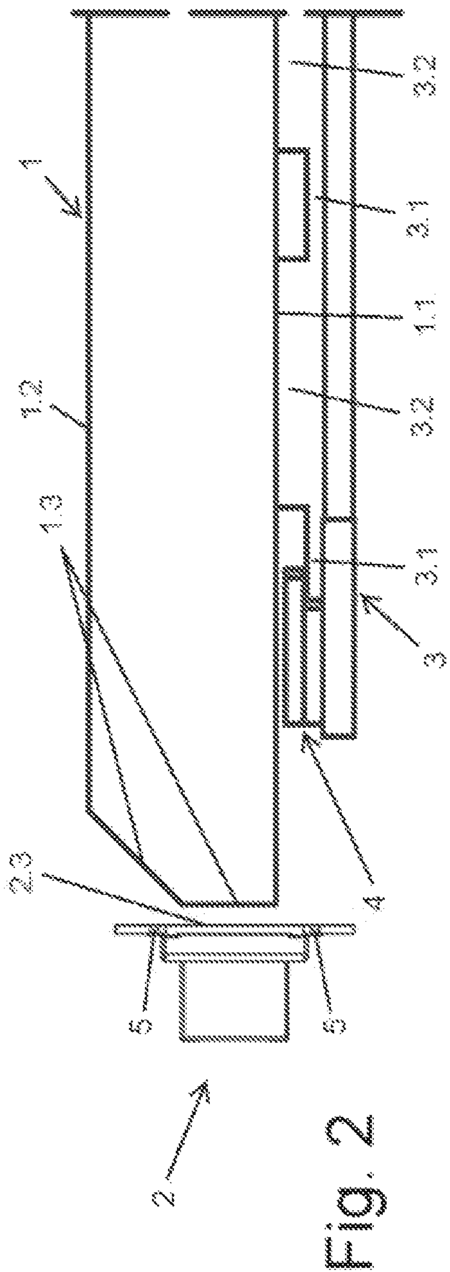
Figure 4:
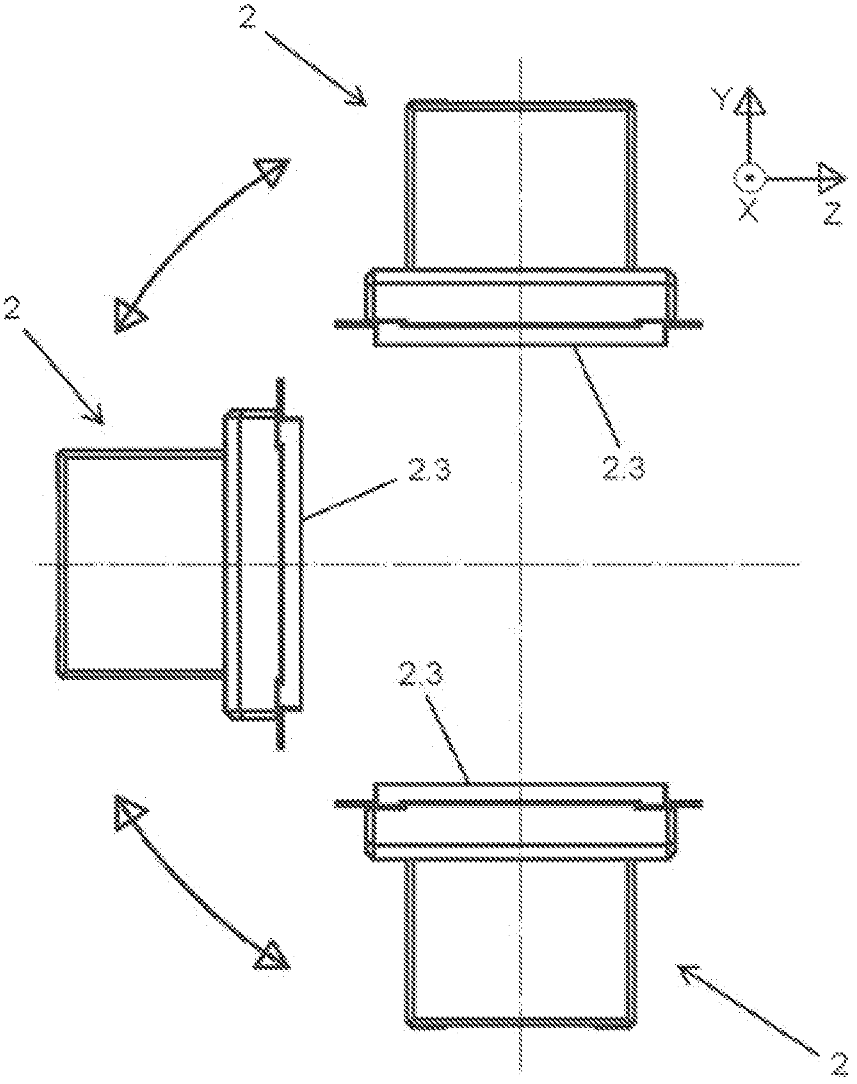
FIG. 4 shows a schematic view of the print head comprised in the machine for printing substrates object of the invention, according to different positions.
Figure 5A:
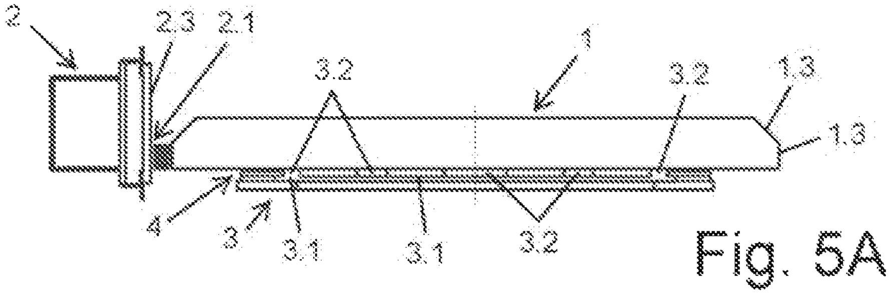
FIGS. 5A, 5B, 5C, and 5D show schematic views of the print head and the translation means supporting the substrate, the print head being in accordance with different positions with respect to the translation means and the substrate.
Figure 5B:
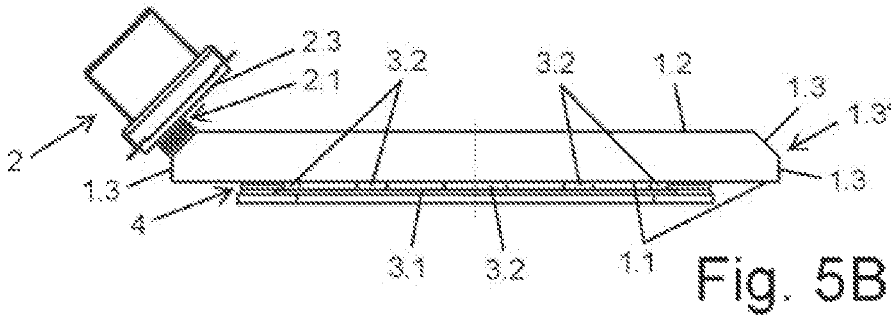
Figure 5C:
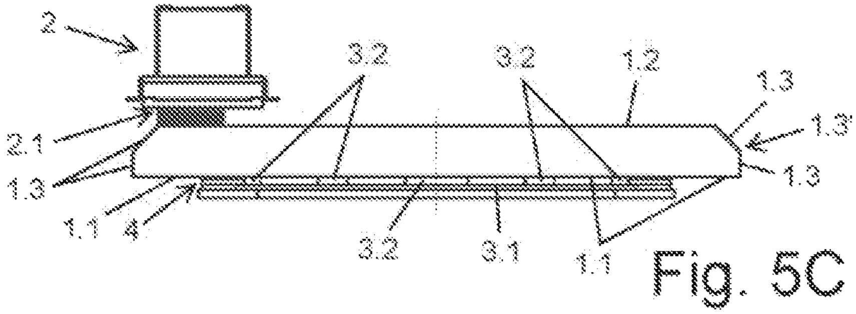
Figure 5D:
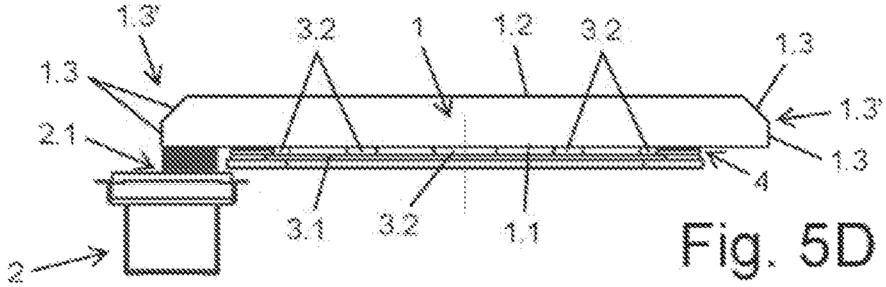

For the purpose of facilitating comprehension, the invention is described below using a system of spatial Cartesian coordinates (X, Y, Z) as a reference. This coordinate system (X, Y, Z), indicated in FIGS. 1 and 4, is formed or defined by a first axis (X), a second axis (Y), and a third axis (Z). These three axes (X, Y, Z) are considered orthogonal to one another.

The substrates (1) to be treated have a discrete or continuous format, i.e., they are elements that can be fed into the present machine either in an individual an independent manner, or in a continuous manner such that they are, for example, unwound or unrolled from a rolled arrangement.

Likewise, the substrates (1) can be made of various materials, comprising a material preferably selected from wood, for example in accordance with medium density fiberboards or “MDF”, high density fiberboards or “HDF”, and particle board; HPL; plastic; composite; and cellulose derivatives such as, for example, paper and cardboard.

For the purpose of treating or printing the corresponding substrate (1), the present invention comprises ejecting preferably at least one product, more preferably two, and even more preferably three. The products to be ejected on the substrate (1) can be selected from a preparation product, a printing product, a finishing product, and any combination of two or more of the foregoing.

For the purpose of treating or printing the corresponding substrate (1) by applying or ejecting at least one of said products, the machine comprises at least one print head (2) and preferably an assembly of print heads (2) such that in addition to one, there can be two, three, four, or more. In turn, each of the print heads (2) has at least one ejection nozzle (2.1) for ejecting the corresponding product on the substrate (1).

Preferably, the print heads (2) have at least one of the ejection nozzles (2.1) defining a preparation unit (A) for ejecting the preparation product on the substrate (1). Accordingly, there are preferably several ejection nozzles (2.1) that define the preparation unit (A) and are arranged in each of the print heads (2) for ejecting the preparation product.

Preferably, the print heads (2) have at least one of the ejection nozzles (2.1) defining a print unit (B) for ejecting the printing product on the substrate (1). Accordingly, there are preferably several ejection nozzles (2.1) that define the print unit (B) and are arranged in each of the print heads (2) for ejecting the printing product.

Preferably, the print heads (2) have at least one of the ejection nozzles (2.1) defining a finishing unit (C) for ejecting the finishing product on the substrate (1). Accordingly, there are preferably several ejection nozzles (2.1) that define the finishing unit (C) and are arranged in each of the print heads (2) for ejecting the finishing product.

The preparation product is selected and applied to be arranged directly on the substrate (1), and to thereby prepare the substrate (1), optionally for a subsequent application of another one of the products. According to one possibility, said preparation product is selected and applied to promote acceptance of or to highlight the corresponding subsequent product applied, said product preferably being the printing product. Thus, by means of ejecting preparation product on the substrate (1), a process referred to as “priming” or an arrangement for obtaining more gloss or a better tone is carried out.

According to another possibility, the preparation product is selected and applied for arranging the substrate (1) in accordance with a planar configuration, i.e., flat and smooth, from a rough configuration. Thus, by means of ejecting preparation product on the substrate (1), pores and other small irregularities are absorbed, covered, or eliminated. In this manner, the substrate (1) is arranged so that the corresponding subsequent product, the latter being the printing product or the finishing product, can be applied thereto.

The preparation unit (A) is configured for ejecting the preparation product. Said preparation product, in a state such that it is ejectable, can be selected from a white substance or ink, a putty, a varnish, a glue or adhesive, and any combination of the foregoing, in accordance with two or more of same.

The printing product corresponds with a printing ink for defining a pattern or image in the substrate (1).

The print unit (B) is configured for ejecting the printing ink. Said ink is of at least one color, and preferably of several colors. The colors can preferably be selected from cyan, magenta, yellow, black, and any combination of the foregoing, in accordance with two or more of same. Optionally, said colors can additionally be selected from light cyan, light magenta, any other color different from the four preceding ones and any combination of same, in accordance with two or more of same. Accordingly, the ejection nozzles (2.1) defining the print unit (B) are arranged for ejecting in accordance with the corresponding color or colors.

The finishing product is selected and applied for externally covering the substrate (1). According to one possibility, said finishing product is selected and applied for protecting at least one of the applied products, such as preferably at least the printing product. According to another possibility, the finishing product is selected and applied for texturizing the substrate (1).

The finishing unit (C), in turn, is configured for ejecting the finishing product. Said finishing product, in a state such that it is ejectable, can be selected from a varnish, a lacquer, and a combination of the foregoing.

As described for the print heads (2), the method comprises using the print heads as described. The description provided in relation to the print heads (2) includes that referring to the ejection nozzles (2.1), the units (A, B, C), and the products.

The machine comprises translation means (3) configured for supporting and translating the substrates (1) in forward movement, in accordance with the first axis (X). Preferably, the substrates (1) are translated longitudinally in forward movement by means of the translation means (3), in accordance with the first axis (X), after being arranged in said means (3) by settling or by gravity, in accordance with the second axis (Y).

Accordingly, the translation means (3) have a movable part (3.1) for contacting the substrates (1) and moving or translating them in forward movement in accordance with a movement of said movable part (3.1). The movable part (3.1) is preferably a conveyor belt. Additionally or alternatively, the movable part (3.1) is a roller assembly, a drive chain, or the like.

These translation means (3) have rotating shafts and a drive motor, at least one of these rotating shafts being operated for rotation by means of the mentioned drive motor, while at the same time at least said rotating shaft is arranged for moving the movable part (3.1).

In the substrate (1), a lower surface (1.1) can be defined in accordance with a facing arrangement with respect to the movable part (3.1); an upper surface (1.2) can be defined in accordance with an arrangement opposite that of the lower surface (1.1) in accordance with the second axis (Y); and inclined surfaces (1.3) can be defined.

The inclined surfaces (1.3) are defined by having an orientation different from that of the lower surface (1.1) and that of the upper surface (1.2); i.e., an imaginary plane containing said inclined surfaces (1.3) forms an angle, other than 0°, with respect to planes containing the lower surface (1.1) and the upper surface (1.2). The inclined surfaces (1.3) can thereby be considered surfaces defining end parts (1.3'), protrusions, and depressions in the substrates (1).

As described for the translation means (3) and the substrates (1), the method comprises using the means and substrates as described. The description provided in relation to the translation means (3) includes that referring to the movable part (3.1) and the definition of the mentioned surfaces (1.1, 1.2, 1.3) in the substrates (1).

The machine comprises positioning means, not depicted in the drawings, for establishing and fixing a relative position between the substrate (1) and each of the print heads (2). The positioning means are elements that can be selected from an electric motor, hydraulic arms, a set of gears, a set of shafts, several clamping elements such as for example nuts or the like, and any combination of two or more of the foregoing.

According to a preferred embodiment, the mentioned positioning means are configured for moving and positioning each of the print heads (2) in accordance with a direction and a sense of ejection with respect to the movable part (3.1), and thus also the substrate (1), for the purpose of treating or printing the substrate (1). See FIG. 4.

The print heads (2) can be moved linearly, in accordance with the second axis (Y), for being moved closer to or farther from the substrate (1) and/or the movable part (3.1). Additionally, the print heads (2) can be moved linearly and laterally, in accordance with the third axis (Z), for being positioned on one side of the substrate (1) and free, therefore, of correspondence with the substrate (1) in accordance with the second axis (Y), or in correspondence with the substrate (1) in accordance with the second axis (Y).

Likewise, the print heads (2) can be moved angularly or rotationally on the first axis (X), as can be seen both in FIG. 4 and in FIGS. 5A to 5D, for ejecting the required products on the corresponding inclined surfaces (1.3). Optionally, the print heads (2) can be moved rotationally also on the second axis (Y) and/or on the third axis (Z)

In accordance with this embodiment, each of the print heads (2) is moved and positioned depending on the substrate (1) to be treated, such that said substrate (1) is translated in forward movement, according to the first axis (X), by the translation means (3), with the print heads (2) being immobile. Thus, ejections of each of the required products are provided in accordance with only straight paths.

According to another preferred embodiment, the mentioned positioning means are configured for moving and positioning the movable part (3.1), and thus also the substrate (1), with respect to each of the print heads (2) according to the direction and sense of ejection for the purpose of treating or printing the substrate (1).

The movable part (3.1), and therefore also the substrate (1), can be moved linearly in accordance with the second axis (Y) and the third axis (Z). Additionally, the movable part (3.1) and therefore also the substrate (1), can be moved angularly or rotationally on the first axis (X), in addition to optionally also on the second axis (Y) and/or on the third axis (Z).

Figure 7:
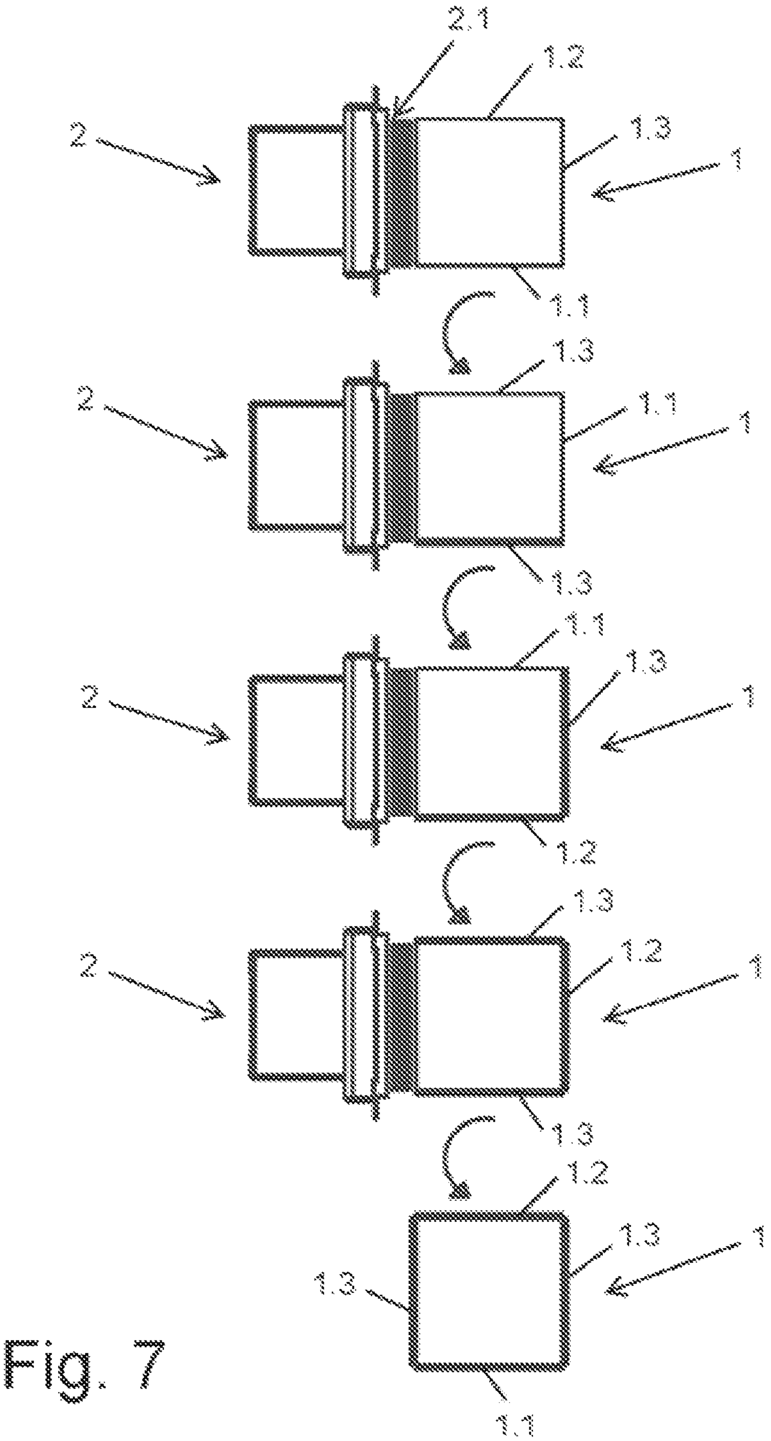
FIG. 7 shows schematic views of a sequence of the print head and the substrate, the substrate being in accordance with different relative positions with respect to the head.

FIG. 7 shows a treatment or printing sequence, according to this other preferred embodiment, of one of the substrates (1) that can be printed by means of the machine and according to the method. This substrate (1) has four surfaces to be treated, with two of these surfaces corresponding with the lower surface (1.1) and upper surface (1.2), and two other surfaces corresponding with the inclined surfaces (1.3) by way of the end parts (1.3') of the substrate (1). Likewise, in view of said FIG. 7 the fixed or immobile arrangement of the print head (2) can clearly be deduced, the substrate (1) being moved and positioned for receiving the ejection of said print head (2), in this case by means of rotations on the first axis (X).

According to this other embodiment, once the positioning means have positioned the movable part (3.1), and therefore also the substrate (1), depending on the direction and the sense of ejection of the print heads (2), said substrate (1) is translated longitudinally or in forward movement, in accordance with the first axis (X), said positioning being maintained. Thus, ejections of each of the required products in accordance with only straight paths are likewise provided.

As described for the positioning means, the method comprises using the means as described. The description provided in relation to the positioning means includes that referring to the preferred embodiments.

The translation means (3) comprise projections (3.2) for contacting the substrate (1) during the support and translation thereof. Specifically, the translation means (3) comprise said projections (3.2) in correspondence with the movable part (3.1). The projections (3.2) are attached to the movable part (3.1) or the projections (3.2) and the movable part (3.1) are formed from a single part.

Therefore, the substrates (1) are thereby supported and translated by means of the movable part (3.1) indirectly, given that the projections (3.2) keep the substrates (1) spaced or separated with respect to said movable part (3.1). The substrates (1) are supported and translated by means of the projections (3.2) directly, given that the projections (3.2) directly contact the substrates (1).

Accordingly, the projections (3.2) are preferably arranged for contacting the substrate (1) according to specific or precise locations, i.e., without contacting any of its surfaces (1.1, 1.2, 1.3) in their entirety. Likewise, the projections (3.2) are arranged for contacting the substrates (1) on at least one of their surfaces (1.1, 1.2, 1.3), leaving at least one of the end parts (1.3') thereof, in addition to areas close to said end part (1.3'), free of contact. See FIGS. 1 to 3 and 5A to 5D.

Accordingly, the projections (3.2) support the substrate (1) to be printed, with the corresponding end parts (1.3'), in addition to their nearby areas, being free such that one of the print heads (2) can be located with respect to the substrate (1) in accordance with the inclined surfaces (1.3) defining the corresponding end parts (1.3'), and with respect to the lower surface (1.1) and the upper surface (1.2). This locating can be carried out by means of a combination of the translation means (3) and the positioning means described above.

As described for the projections (3.2), the method comprises using said projections as described.

The machine comprises guiding means (4) for guiding the movable part (3.1). The movable part (3.1) may tend to deviate from a predetermined desired path due to clearances therein, a non-uniform operation, or with jerking movements of the drive motor, etc. Accordingly, the guiding means (4) are arranged for preventing these deviations of the movable part (3.1) upon moving to translate the substrates (1) in forward movement.

By using the guiding means (4), an offset between a theoretical portion of the substrate (1) to be treated and an actual portion of the substrate (1) treated by the ejection of each of the print heads (2) is limited or even eliminated. The ejection of each of the print heads (2) with respect to the substrates (1) translated in forward movement to the corresponding print heads (2) is thereby optimized by means of the guiding means (4) with regard to precision. Thus, by means of the mentioned guiding means (4), high-resolution results with high-quality finishes with respect to treatment or printing on the substrates (1) can be obtained without using said guiding means (4).

The guiding means (4) preferably comprise stops, said stops being arranged for preventing unwanted lateral movements of the movable part (3.1), i.e., according to the third axis (Z), in accordance with the desired resolution and finish quality.

The stops are preferably located in accordance with one side of the movable part (3.1), and more preferably with the two sides of said movable part (3.1). Likewise, said stops are arranged according to the spacing between the movable part (3.1) and the substrates (1) provided by the projections (3.2).

Both when the movable part (3.1) corresponds with the conveyor belt and when it corresponds with the roller assembly or the like, the stops are physical parts arranged fixed in the present machine. The guiding means (4), and more specifically the stops, thereby act by contact against the movable part (3.1).

As described for the guiding means (4), the method comprises using said means as described. The description provided in relation to the guiding means (4) includes that referring to the stops.

Also for the purpose of obtaining high-resolution results with high-quality finishes in the printing or treatment of the substrates (1), the machine comprises holding means for fixing, and keeping fixed, the corresponding substrate (1) with respect to the movable part (3.1) or, in other words, in the movable part (3.1) indirectly as said substrate (1) is in contact with the movable part (3.1) through the projections (3.2).

The substrates (1) may tend to move with respect to a placement position in the translation means (3), and more specifically in the movable part (3.1), due to vibrations in the longitudinal translation thereof, the application of the corresponding required products, etc. Accordingly, the holding means are arranged for preventing these movements with respect to the movable part (3.1).

Likewise, the offset between the theoretical portion of the substrate (1) to be treated and the actual portion of the substrate (1) treated by the ejection of each of the print heads (2) is limited or even eliminated by using the holding means. The ejection of each of the print heads (2) with respect to the substrates (1) translated in forward movement to said heads (2) is also thereby optimized by the holding means with regard to precision.

The mentioned holding means are configured for exerting suction on the substrate (1) such that it is arranged and kept immobilized with respect to the movable part (3.1). Accordingly, the substrates (1) are fixed and kept fixed by a vacuum in the movable part (3.1) indirectly as said substrates (1) are in contact with the movable part (3.1) through the projections (3.2), i.e., being devoid of mechanical anchoring elements.

Therefore, by means of said suction, holding the substrates (1) in a manner which results in damage to the substrates (1) themselves, limitations on the surfaces (1.1, 1.2, 1.3) to be printed or treated, and limitations in the arrangement between the print heads (2) and said surfaces (1.1, 1.2, 1.3) is prevented by means of both the translation means (3) and the positioning means.

The holding means comprise through holes, not indicated in the drawings for the sake of clarity. These through holes are arranged such that the holding means exert suction on the substrate (1) through the translation means (3), more specifically through the movable part (3.1), and even more specifically through both the movable part (3.1) and the projections (3.2). The holding means additionally comprise a vacuum pump for generating the suction.

As described for the holding means, the method comprises using said means as described. The description provided in relation to the holding means includes that referring to the through holes and the vacuum pump.

Also for the purpose of obtaining high-resolution results with high-quality finishes in the printing or treatment of the substrates (1), the print heads (2) have drying elements (2.2) configured for at least partially drying or curing the products ejected by the ejection nozzles (2.1). Preferably, the drying elements (2.2) are radiation emission sources, such as UV, UV-LED, Eb, hot air, infrared, etc. Therefore, the drying elements (2.2) are preferably lamps. Alternatively, the drying elements (2.2) are sources of chemical substances which accelerate the curing of the products. Therefore, the drying elements (2.2) are injectors.

More specifically, the print heads (2) have one of the drying elements (2.2) for each of the ejection nozzles (2.1). Furthermore, each of said drying elements (2.2) is arranged close to the corresponding ejection nozzle (2.1). Therefore, the previously described units (A, B, C) are additionally defined by the corresponding drying elements (2.2). See FIG. 6.

Therefore, from the time the required product is ejected by the corresponding ejection nozzle (2.1), said ejected product may be subjected to drying due to the action of the corresponding drying element (2.2). Thus, the ejection of each of the ejection nozzles (2.1) is available in the substrate (1) according to a desired state.

According to one option, the mentioned desired state corresponds with an intermediate dried or cured state, also referred to as semi-dry or semi-cured state. In other words, the product ejected by the corresponding nozzle (2.1) is partially cured or dried, without becoming entirely or completely hardened.

In accordance with this option, the machine preferably comprises one additional drying element, not shown in the drawings, for drying or curing the substrate (1) according to the products applied. This drying or curing is at least partial such that the products ejected or printed on the substrate (1) can be according to the semi-dry or semi-cured state, i.e., use of the additional drying element, in addition to use of drying elements (2.2), can be to leave or arrange the corresponding products in a combined manner on the substrate (1) in accordance with the intermediate drying state. Likewise, the mentioned additional drying element is preferably independent with respect to the print heads (2) of the machine.

According to another option, the mentioned desired state corresponds with a final dried or cured state, also referred to as completely dry or cured state. In other words, the product ejected by the corresponding nozzle (2.1) is completely or entirely cured or dried.

According to these options, each of the required products can be applied on the substrates (1) according to different layers. Thus, at least one of the products can be applied on the substrates (1) according to the different layers such that a thickness or a height thereof is increased in a localized manner in at least one ejection point, in accordance with both the ejection and the curing thereof, such that relief formations are created on the surfaces (1.1, 1.2, 1.3) of the substrates (1). Preferably, the relief formations are created by means of the increase in the thickness of the printing product and/or finishing product.

As described for the drying elements (2.2), the method comprises using said elements as described. The description provided in relation to the drying elements (2.2) includes that referring to the additional drying element.

Figure 6:
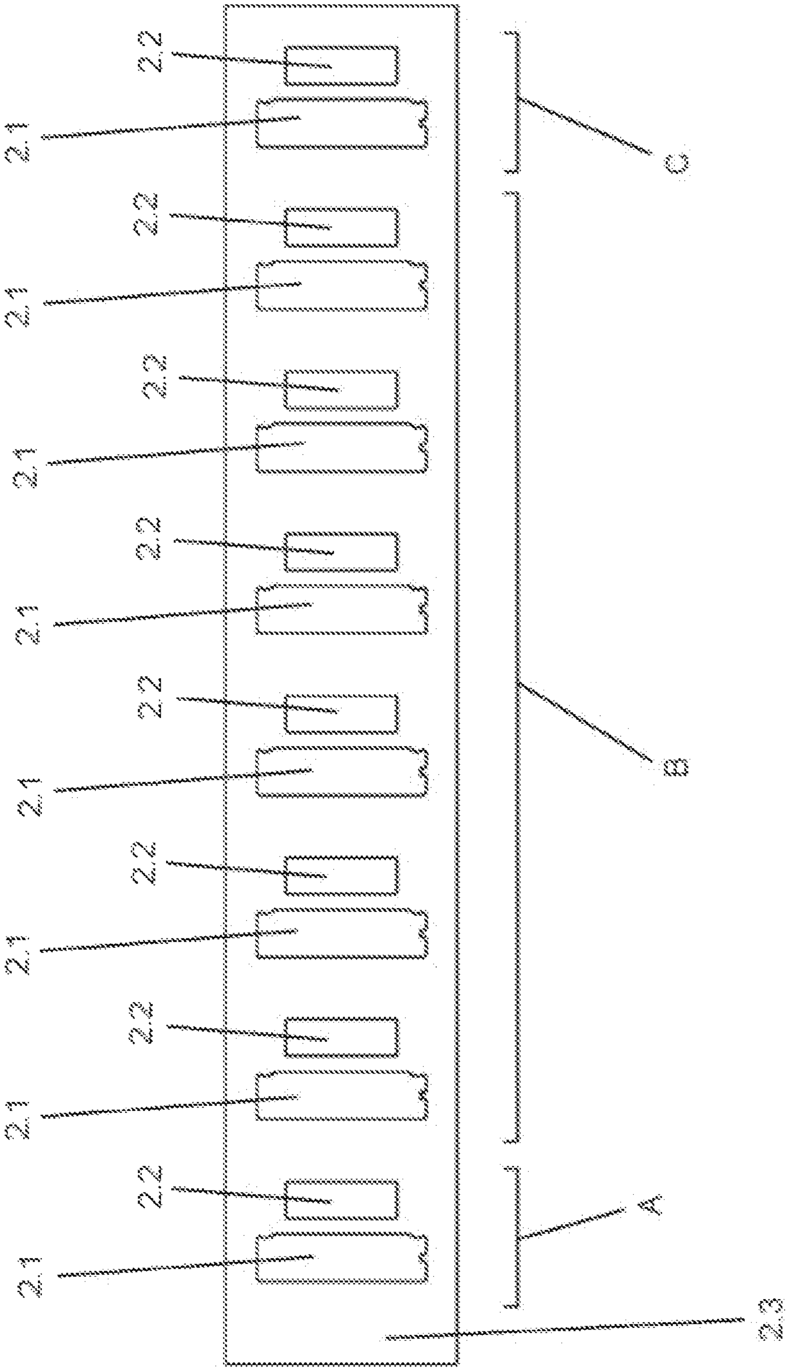
FIG. 6 shows a base of the print head comprised in the machine for printing substrates object of the invention, according to an embodiment.

FIG. 6 shows an embodiment of a base (2.3) of the print heads (2). In this embodiment, the ejection nozzles (2.1) are aligned, said injection nozzles (2.1) being arranged in an alternating manner with the corresponding drying elements (2.2).

Following said aligned order, firstly the preparation unit (A) is arranged for ejecting the preparation product, said preparation unit (A) being defined by only one of the ejection nozzles (2.1).

Secondly, the print unit (B) is arranged for ejecting the printing ink as the printing product, said print unit (B) being defined by six of the ejection nozzles (2.1). Of these six ejection nozzles (2.1), one is for ejecting the cyan color printing ink, another one is for ejecting the magenta color printing ink, another one is for ejecting the yellow color printing ink, another one is for ejecting the black color printing ink, another one is for ejecting the light cyan color printing ink, and another one is for ejecting the light magenta color printing ink.

Thirdly, the finishing unit (C) is arranged for ejecting the finishing product, said finishing unit (C) being defined by only one of the ejection nozzles (2.1).

As described, the base (2.3) is configured with the ejection nozzles (2.1) aligned according to an order for the use thereof. Though the order and the number of ejection nozzles (2.1) defining the print unit (B) have been described, both the order and the number can be changed depending on the pattern to be printed on the substrate (1). Likewise, the number of ejection nozzles (2.1) defining the preparation unit (A) and finishing unit (C) can be changed, possibly being more.

By using any one of the ejection points as the reference point to be treated or printed on one of the surfaces (1.1, 1.2, 1.3) of the substrate (1), the first of the ejection nozzles (2.1) of the base (2.3) when moved in correspondence with the reference point is the one defining the preparation unit (A), such that the preparation product is applicable at said point when the treatment or the printing to be performed requires applying said preparation product. Where application of the preparation product is not necessary or required, said ejection nozzle (2.1) is moved in correspondence with the reference point without ejecting the mentioned product.

The ejection nozzles (2.1) defining the print unit (B) are moved in correspondence with the reference point after the ejection nozzle (2.1) defining the preparation unit (A). The ejection nozzles (2.1) arranged for ejecting the printing product are arranged in an amount and a sequence depending on requirements determined by the pattern to be printed in reference to the different colors to be applied and the order thereof. Optionally, at least one of these ejection nozzles (2.1) can be moved in correspondence with the reference point without ejecting the printing product.

After the ejection nozzles (2.1) defining the print unit (B), the last of the ejection nozzles (2.1) of the base (2.3) when moved in correspondence with the reference point is the one defining the finishing unit (C), such that the finishing product is applicable at said point when the treatment or the printing to be performed requires applying said finishing product. Where application of the finishing product is not necessary or required, said ejection nozzle (2.1) is moved in correspondence with the reference point without ejecting the mentioned product.

As mentioned above, in addition to being noticeable in FIG. 6, the base (2.3) has one of the drying elements (2.2) immediately after each of the ejection nozzles (2.1). Therefore, immediately after the movement of each of the ejection nozzles (2.1) in correspondence with the reference point, the corresponding drying element (2.2) is also moved.

The ejection nozzles (2.1) can be actuated independently of one another. Therefore, in addition to selecting the colors to be applied, the ejection capacity in accordance with the ejection points on each of the surfaces (1.1, 1.2, 1.3) of the substrate (1) is also provided. See FIGS. 5A to 5D, in which the activation of the ejection nozzles (2.1) is adapted in each of the figures.

The drying elements (2.2) can likewise be actuated independently of one another and with respect to the ejection nozzle (2.1) with which each of them is associated. This leads to the attainment of a wider range of textures, relief formations, tones, etc.

Likewise, each of print heads (2) can have one, two, three, or more of these bases (2.3), increasing a printing capacity as described.

As described for the base (2.3), the method comprises using the said base as described.

For the purpose of optimizing the attainment of high-resolution results with high-quality finishes in the printing or treatment of the substrates (1), the machine comprises masking means.

The masking means are configured for preventing a dispersion of at least one of the ejected products, and preferably of the different ejected products from reaching the substrate (1).

When the products are ejected by the print heads (2) through the ejection nozzles (2.1), this ejection is performed in a rectilinear manner, i.e., in accordance with the direction and sense defined by said nozzle (2.1). However, ejection by the ejection nozzles (2.1) entails dispersion of the ejected products, albeit in a very low percentage, almost imperceptible to the human eye, but it does take place. This dispersion can be defined by a separation or deviation of micro-droplets with respect to the rectilinear path of the ejections.

This dispersion generates unwanted contamination of locations other than those corresponding to the ejection points in each of the ejections. Likewise, said dispersion generates an arrangement of the products suspended in air, referred to as a "mist". Accordingly, the dispersion results in fouling or an impediment for optimizing the results of printing on the substrates (1).

Accordingly, the masking means comprise at least one suction hole (5), and preferably several, for suctioning up the dispersed product, the corresponding suction holes (5) being arranged in the print head (2). See FIG. 2.

The dispersed product can be suctioned up through these suction holes (5) in accordance with a path preferably at least substantially parallel and more preferably parallel to the ejection path of the corresponding product. Therefore, said suction holes (5) are arranged such that interference with product being ejected in accordance with the corresponding rectilinear path is minimized or even eliminated, while at the same time the corresponding dispersions are prevented from reaching the substrate (1).

Figure 3:
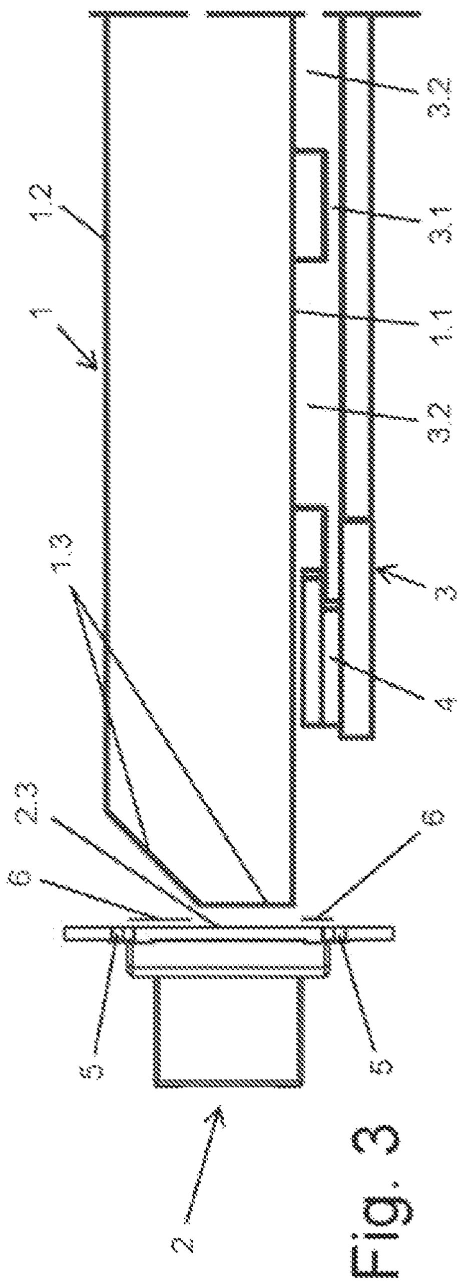

Preferably in an alternative manner, though as can be seen in FIG. 3 it can be in a complementary manner, the masking means comprise a film (6) for receiving and retaining the dispersed product, the film (6) being arranged in the print head (2).

The film (6) has a discrete or continuous format, i.e., it is available and removable at the corresponding print head (2) in an individual and isolated manner or by movement thereof, in accordance with either a continuous movement or periodic movements. When the film (6) has a continuous format, said film (6) is unwound from a rolled arrangement in order to be moved.

According to one possibility, the film (6) is rewound. Therefore, the film (6) is collected, for example, for later use, cleaning, or disposal thereof. According to another possibility, the film (6) has a continuous format such that it determines a closed path, i.e., an endless or closed-loop path. According to another possibility, the machine comprises cleaning means for cleaning the film (6) continuously.

These cleaning means, not shown in the drawings, are arranged and configured such that after each of the movements of each portion thereof in correspondence with the corresponding print head (2), the dispersed product that has hit and been retained at said portions is cleaned off same so as to receive the dispersed product again.

These cleaning means are configured for removing, eliminating, or getting rid of the corresponding products from the film (6). Therefore, said cleaning means are configured for applying a solvent and subsequent cleaning and drying, for example by means of rollers or the like. Additionally or alternatively, said cleaning means are configured for using a scraping element such that they mechanically separate the corresponding products from the film (6). Optionally, the cleaning means are configured for, additionally or as an alternative to that described, applying ultrasounds.

As described for the masking means, the method comprises using said means as described. The description provided in relation to the masking means includes that referring to the suction holes (5), the film (6), and the cleaning means.

The machine comprises control means for managing the machine when applying the method. The control means comprise a storage unit for receiving and storing data and a processing unit for processing said data such that machine operation is manageable. Additionally, said control means are connected, for example, to the positioning means, the print heads (2), and the translation means (3) for controlling the actuation thereof.

On one hand, the data to be received, stored, and processed can be the data referring to the substrate (1). Preferably, the control means are additionally configured for editing this data. The data relating to the substrate (1) comprises geometries, dimensions, translational speed, and relative position with respect to the print head (2).

On the other hand, the data to be received, stored, and processed can be the data referring to the pattern to be printed on the substrate (1). Preferably, the control means are additionally configured for editing this data. The data relating to the pattern comprises composition and amount of each of the products to be ejected by each of the ejection nozzles (2.1). The control means thus define the products to be ejected, the colors of the printing ink to be ejected, and the thickness to be obtained in a localized manner at the ejection points in accordance with both the ejection and the curing of each of the products.

Accordingly, the control means are configured for actuating the positioning means and the translation means (3), in addition to the print heads (2), including both the ejection nozzles (2.1) and the drying elements (2.2), depending on the substrate (1) and the pattern.

The control means, and more specifically the mentioned storage unit, are configured for receiving and storing data referring to the substrate (1) and/or the pattern by means of computer files. Additionally or alternatively, the machine comprises sensing means, not shown in the drawings, for detecting and recognizing the substrates (1) to be printed or treated such that they generate the mentioned data referring to the substrates (1). Accordingly, the control means are additionally connected with said sensing means for receiving, storing, and processing said generated data.

As described for the control means and the sensing means, the method comprises using said means as described. The description provided in relation to the control means includes that referring to the storage unit and the processing unit, including that in relation to the data referring to the substrate (1) and referring to the pattern.

Optionally, the data to be received, stored, and processed by the control means can be that data referring to the positioning means, the print heads (2), and the translation means (3) for, in addition to controlling the actuation thereof, determining a number of passes to be performed when printing the corresponding substrate (1). Accordingly, the processing unit is configured for determining the number of passes depending on the data referring to the substrate (1), the data referring to the pattern, and the data referring to the positioning means, the print heads (2), and the translation means (3).

Alternatively, the number of passes is determined by an operator by means of editing software comprised in the machine. Likewise, this editing is performed depending on the data referring to the substrate (1), the data referring to the pattern, and the data referring to the positioning means, the print heads (2), and the translation means (3).

When the number of passes determined is one, the control means establish and carry out the actuation of the positioning means and the translation means (3) such that, also depending on the print heads (2), the ejection points of each of the surfaces (1.1, 1.2, 1.3) are covered by the required ejection nozzles (2.1) in the single pass, the printing being obtained with the appropriate products to be ejected, the colors of the printing ink to be ejected, and the predetermined thickness at each of the ejection points in accordance with both the ejection and the curing of each of the products.

When the number of passes determined is more than one, the control means establish and carry out the actuation of the positioning means and the translation means (3) such that, also depending on the print heads (2), the ejection points of each of the surfaces (1.1, 1.2, 1.3) are covered by the required ejection nozzles (2.1) by combining or superimposing the printings of each of the passes, the printing being obtained with the appropriate products to be ejected, the colors of the printing ink to be ejected, and the predetermined thickness at each of the ejection points in accordance with both the ejection and the curing of each of the products.

Figure 8:
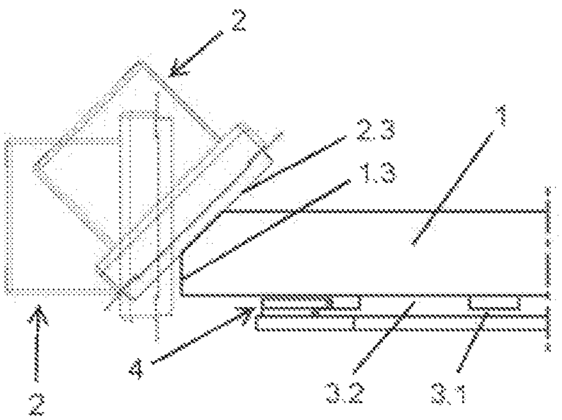
FIG. 8 shows a schematic view of the substrate and two of the print heads superimposed, in accordance with two different positions, to print an end part of the substrate defined by two inclined surfaces in accordance with a single pass.

FIG. 8 shows one of the substrates (1) and two of the print heads (2) positioned with respect to one another, such that the two corresponding inclined surfaces (1.3) of the inclined part (1.3') that can be seen are printed in the single pass to be performed.

Figure 9A:
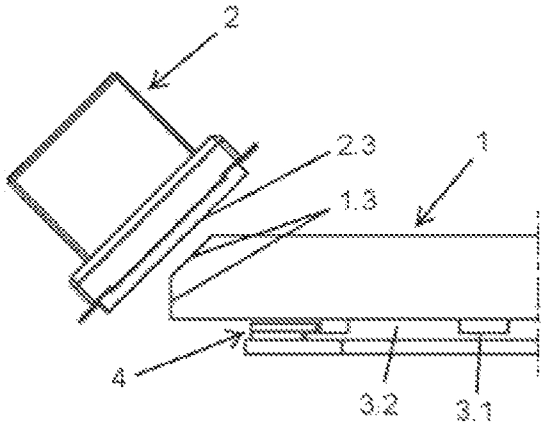
FIGS. 9A and 9B show schematic views of the substrate and the print head according to two different positions for printing the end part of the substrate defined by the two inclined surfaces in accordance with two passes.
Figure 9B:
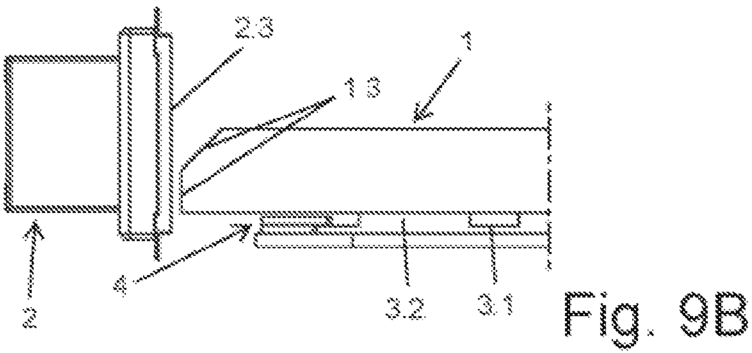

Each of FIGS. 9A and 9B, in contrast, shows one of the substrates (1) and one of the print heads (2) positioned with respect to one another, such that the two corresponding inclined surfaces (1.3) of the inclined part (1.3') that can be seen are printed in the respective two passes, one pass for each of the surfaces (1.3) to be printed by the corresponding print heads (2).

Likewise, both when one pass is to be performed and when at least two are to be performed, each of the print heads (2) ejects each of the required products by means of the corresponding ejection nozzles (2.1), with the masking means preferably being arranged in the respective print heads (2).

The invention claimed is:

1. A machine for printing substrates, comprising:

a print head, the print head having at least one ejection nozzle for ejecting a product on the substrate;

translation means with a movable part, the translation means configured to support and translate the substrate by means of the movable part;

positioning means for establishing and fixing a relative position between the substrate and the print head;

guiding means for guiding the movable part;

holding means for fixing the substrate with respect to the movable part;

wherein with the substrate being fixed to the movable part and the movable part guided by the guiding means, the substrate can be translated to receive the product being ejected, wherein the translation means comprise projections in the movable part to establish, by contact, the support and translation of the substrate, at least one end part of the substrate and at least one surface adjacent to the end part being free of contacts such that the print head is located in correspondence with a lower surface, an upper surface, and the end part joining the lower surface with the upper surface for ejecting the product onto the substrate.

2. The machine according to claim 1, wherein the guiding means comprise stops for preventing lateral movements of the movable part.

3. The machine according to claim 1, wherein the holding means are configured for fixing the substrate by suction.

4. The machine according to claim 1, wherein the holding means comprise through holes arranged for fixing the substrate through the translation means.

5. The machine according to claim 1, wherein the at least one ejection nozzle and the products are at least three in number, the at least one ejection nozzle being arranged for ejecting each of the products in an independent manner, the products being a preparation product to be arranged directly on the substrate, a printing ink, and a finishing product for externally covering the printed substrate.

6. The machine according to claim 1, wherein the print head has one drying element for each of the at least one ejection nozzle, each of the drying elements being arranged for at least partially curing the product from one of the at least one ejection nozzle.

7. The machine according to claim 1, further comprising masking means in the print head configured to prevent a dispersion of the ejected product from reaching the substrate.

8. The machine according to claim 7, wherein the masking means comprise a suction hole for suctioning up the dispersed product and/or a film for receiving the dispersed product.

9. The machine according to claim 1, further comprising control means for providing data relating to the substrate and data relating to a pattern to be printed, the control means connected to the positioning means, the print head, and the translation means such that they actuate each of the at least one ejection nozzle depending on the data and on a number of passes to be carried out.

10. The machine according to claim 9, wherein the data relating to the substrate comprises geometries, dimensions, translational speed, and relative position with respect to the print head and/or the data relating to the pattern comprises composition and amount of the product to be ejected by each of the at least one ejection nozzle.

11. A method for printing substrates using the machine according to claim 1.

* * * * *